United States Patent Office 3,574,540
Patented Apr. 13, 1971

3,574,540
PROCESS FOR THE PRODUCTION OF
BLANC FIXE
Arvel O. Franz and Fred F. Lester, Cartersville, Ga.,
assignors to Chemical Products Corporation, Cartersville, Ga.
No Drawing. Filed May 6, 1968, Ser. No. 727,077
Int. Cl. C01f 11/46
U.S. Cl. 23—122                                   15 Claims

ABSTRACT OF THE DISCLOSURE

A process for preparing blanc fixe from barium carbonate which contains sulfur impurities, comprising reacting barium carbonate with sulfuric acid, in an environment having a strong oxidation potential and in the presence of a minor amount of an acid which forms a soluble barium salt. Substantially all of the sulfur present in the barium carbonate as impurities should be either in the form of barium sulfate or in the form of compounds oxidizable by iodine at room temperature. Blanc fixe so produced is particularly suitable for use in coating photographic papers.

BACKGROUND OF INVENTION

This invention is directed to a process for the manufacture of barium sulfate, or blanc fixe. More specifically, this invention is directed to a method of producing blanc fixe of a grade suitable for coating very high grades of paper, such as photographic paper.

Barium sulfate has long been known as a chemical pigment. Despite the fact that it has poor hiding power, its stability, permanence, chemical inertness, and pure white characteristics make barium sulfate particularly suitable for coating the very highest grades of paper, and particularly photographic paper.

Barium sulfate for use in coating photographic paper must be very pure, since even very small amounts of impurities may affect the speed of photographic emulsions, or may react with photosensitive chemicals present in the photographic emulsions. Two particularly troublesome impurities, which must be reduced to very low levels in barium sulfate suitable for coating photographic paper, are iron and reducible sulfur. The expression "reducible sulfur" as used herein refers to sulfur compounds which yield hydrogen sulfide on acidification, or sulfur compounds whcih can be reduced by nascent hydrogen to yield hydrogen sulfide.

Blanc fixe may be produced by precipitation of a soluble barium compound, such as barium chloride, by means of either a sulfate, such as sodium sulfate, or sulfuric acid. By this process, employing highly purified reagents, a high quality product is obtained which is substantially free of both iron group impurities and reducible compounds of sulfur. This process is, however, comparatively expensive, as the reagents are relatively expensive and the yield of blanc fixe is relatively low.

In an effort to more economically obtain blanc fixe suitable for use in coating photographic papers, it has long been desired to produce blanc fixe from barium carbonate. Barium carbonate is normally precipitated from a solution of barium sulfide with either an alkali metal carbonate or a carbon dioxide containing gas. The carbonate thus obtained is contaminated with a variety of sulfur compounds, generally ranging from about 0.03% to about 1% by weight, calculated as elemental sufur. Blanc fixe, suitable for coating photographic paper, generally must not contain more than a few parts per million of reducible sulfur compounds. Because of the relatively large amount of sulfur impurities normally present in barium carbonate, it has not been possible to directly produce photographic grade blanc fixe by precipitation barium sulfate from barium carbonate solutions with sulfuric acid.

Because of the sulfur compounds normally present in barium carbonate, a process has been developed for producing a special grade of barium carbonate from which blanc fixe suitable for use in coating photographic papers may be prepared. Barium carbonate suitable for use in preparing photographic grade blanc fixe has been prepared by calcining the barium carbonate in an oxidizing atmosphere to a temperature sufficiently high to oxidize all of the various sulfur compounds present to barium sulfate. Active oxidation of these compounds does not occur until a temperature of incipient sintering is reached, about 1400° F., and is not rapid until a temperature of about 1800° F. is reached. At these temperatures, barium carbonate is very corrosive and attacks all but the most expensive refractories. Also, at these temperatures, barium carbonate coats the various equipment employed, such as rotary calciners, thus reducing their efficiency. During the high temperature oxidation, impurities are unavoidably added, while impurities already present, such as iron and alumina compounds, are converted to acid insoluble forms. In addition, the hard sintered product must be ground into an impalpably fine powder if the blanc fixe producing reaction is to proceed at a reasonable reaction rate. It is thus readily apparent that the preparation of this special grade of barium carbonate is a costly and difficult operation. It is further apparent that it would be desirable to prepare a blanc fixe pigment suitable for coating photographic paper from uncalcined barium carbonate.

SUMMARY OF INVENTION

It has been found that if barium carbonate, in which substantially all of the sulfur impurities present are either in the form of barium sulfate or in the form of sulfur compounds which are oxidizable by iodine at room temperature, is reacted in a hot (preferably above 70° C.) aqueous medium having a strong oxidation potential, with sulfuric acid, in the presence of a minor amount of an acid which forms a soluble barium salt, blanc fixe suitable for coating photographic paper is obtained.

Blanc fixe prepared in accordance with the above described process generally contains less than two parts per million of reducible sulfur compounds. If a medium having a very strong oxidation potential is employed, a product is obtained which contains less than one part per million of reducible sulfur compounds. Blanc fixe so prepared has a lower iron content, both in terms of total iron content, and in iron-containing particulate material, than blanc fixe produced from calcined barium carbonate.

DETAILED DESCRIPTION

As previously mentioned, barium carbonate is ordinarily obtained as a precipitate from the reaction, in an aqueous medium, a barium sulfide with an alkali metal carbonate, or a carbon dioxide containing gas such as flue gas. The product obtained contains a substantial amount of various sulfur compounds, including sulfide, elemental sulfur, polysulfide sulfur, thiosulfates, sulfites, and sulfates, present as impurities. These sulfur impurities are placed into several categories, based primarily on methods of analysis. Sulfur impurities referred to herein as "acid insoluble" are determined by dissolving a barium carbonate sample in hydrochloric acid, filtering the resultant mixture, and weighing the residue. The acid insoluble compounds are primarily barium sulfate. "Gravimetric sulfur" refers to all sulfur impurities, including acid insoluble. Gravimetric sulfur is determined by dissolving a sample in hydrochloric acid in the presence of an excess of bromine water, boiling the resultant mixture whereby all sulfur impurities are oxidized to sulfates, and recovering and weighing the insoluble barium sulfate residue. "Reducing sulfur" may be determined by a volumetric procedure in which a barium carbonate sample is dissolved in hydrochloric acid, at room temperature, in the presence of a known amount of iodine, and titrating to determine the amount of iodine present in excess of that which reacts to oxidize sulfur impurities to the sulfate form. It should not be inferred that iodine at room temperature completely oxidizes all forms of sulfur impurities present to sulfate. Iodine at room temperature only oxidizes the more readily oxidizable forms of sulfur to sulfate. It is believed that reducing sulfur does not include the sulfur impurities in which the sulfur has a valence of six (sulfates) nor the sulfur impurities in which the sulfur has a zero valence (elemental sulfur or polysulfide sulfur). "Reducible sulfur" refers to all forms of sulfur impurities having a valence of less than six, including elemental sulfur and polysulfide sulfur. Reducible sulfur may be determined by dissolving a sample of barium carbonate in acid in the presence of either zinc or aluminum, under conditions such that nascent hydrogen is obtained, and determining the amount of hydrogen sulfide produced. The amount of hydrogen sulfide produced may be determined by the darkening of lead acetate paper.

Barium carbonate obtained by precipitation with alkali metal carbonates generally contains from about 0.03% to about 0.07% by weight sulfur impurities, calculated as elemental sulfur. Substantially all of the sulfur compounds present are either in the form of reducing sulfur (oxidizable by iodine at room temperature) or acid insoluble. Since the acid insoluble impurities are primarily barium sulfate, it is apparent that barium carbonate obtained by the precipitation with alkali metal carbonates is well suited for use in the present process.

Barium carbonate obtained by precipitation with a carbon dioxide containing gas may contain from about 0.07 to 1%, or more, sulfur impurities, calculated as elemental sulfur. Often a substantial amount of the oxidizable sulfur impurities present are not in the form of reducing sulfur (oxidizable by iodine at room temperature). It is therefore apparent that barium carbonate prepared by precipitation with a carbon dioxide containing gas is not necessarily suitable for use in the present process. However, if the preparation of barium carbonate by precipitation with a carbon dioxide containing gas is carefully controlled, as by controlling the amount of oxygen present in the carbon dioxide containing gas, it is possible to obtain a product in which substantially all of the sulfur impurities present are either acid insoluble or oxidizable by iodine at room temperature. The manner in which barium carbonate is obtained is not critical with respect to the present process, as long as the barium carbonate does not contain substantial amounts of oxidizable sulfur impurities which are not oxidizable by iodine at room temperature.

When it is stated that substantially all the oxidizable sulfur impurities which are present should be oxidizable by iodine at room temperature, it is mean that the barium carbonate should contain no more than 0.03% by weight sulfur impurities which are neither acid insoluble nor oxidizable by iodine at room temperature.

While the subject invention is not dependent on any theory of the mechanism of the process, it is believed that the oxidizable sulfur impurities which are not oxidizable by iodine at room temperature are present in the form of elemental sulfur or polysulfide sulfur. It is well known that sulfur having an effective zero valence, i.e., either elemental sulfur or polysulfide sulfur, is far more difficult to oxidize than other forms of oxidizable sulfur. It is believed that the zero valence sulfur impurities are present in the form of crystals or aggregates of at least colloidal size. Even though the reaction medium has a sufficient oxidizing potential to oxidize these crystals or aggregates to sulfates if given enough time, they may become enclosed or occluded by crystals of the forming blanc fixe, before they are completely oxidized. Once they are occluded in the blanc fixe, further oxidation is inhibited. Any zero valance sulfur which results from the partial oxidation of sulfide ions will be produced at atomic size in a strongly oxidizing environment. Such sulfur is very rapidly oxidized, thus, the occlusion of such sulfur in the forming blanc fixe prior to further oxidation is unlikely. Other forms of oxidizable sulfur present as impurities are more readily oxidized than the zero valence sulfur, and hence they are more apt to be oxidized as they are released from the crystals of barium carbonate and before they can be occluded in the forming crystals of blanc fixe.

The strong oxidizing potential of the aqueous medium may be obtained by direct electrolytic oxidation or by the addition of suitable chemical oxidizing agents. A suitable oxidizing potential is one that is capable of oxidizing bromide to bromine, at a temperature of 70° C. in a five percent hydrochloric acid solution. Suitable oxidizing agents would include bromine, or those oxidizing agents which are capable of releasing bromine from a bromide in a hot acid solution, as for example peroxides and peroxy acids, salts of peroxy acids such as perborates, peracetates, persulfates, etc., hypochlorites, hypobromites, etc. Specific examples of suitable oxidizing agents, in addition to bromine, include hydrogen peroxide, ammonium persulfate, hypobromous acid, and a per compound prepared by oxidative electrolysis of sulfuric acid. Chlorine may also be used as an oxidizing agent, but because of the substantial insolubility of chlorine in acid solutions at the temperatures employed, chlorine is not as satisfactory an oxidizing agent as many other compounds, unless a small amount of bromine is added to the aqueous medium.

It has been found that blanc fixe having the lowest amount of reducible sulfur is obtained if the aqueous medium is oxidizing from beginning to the end of the reaction period. For example, the best results are obtained when a test with starch iodide paper shows the presence of an excess of active oxidizing agent in the aqueous medium throughout the reaction period. It is preferred to employ an oxidizing medium which has an oxidizing capacity in excess of that theoretically required to oxidize all of oxidizable sulfur present to barium sulfate.

The electrical conductivity of barium carbonate suspensions is too low to permit rapid direct electrolytic oxidation of the sulfur compounds present but if the rate of reaction is reduced, satisfactory blanc fixe may be produced in this manner. Direct electrolytic oxidation is theoretically the most desirable method of preparing blanc fixe. However, because of the low conductivity of the barium carbonate suspension and because electrodes exhibit a baffling effect, preventing thorough mixing of the reactants, in practice this method is not as useful as methods employing chemical oxidizing agents.

A particularly advantageous oxidizing agent is perdisulfuric acid. Cold sulfuric acid, (below 50° C. and preferably below 30° C.) can be electrolyzed as a high current density (about 100 amp/dm.$^2$) to produce perdisulfuric acid as a maximum current efficiency of over 70%. The formation of per-disulfuric acid is catalyzed by many materials, including hydrochloric acid. Perdisulfuric acid, in acid solutions, above 70° C., is a very strong oxidizing agent. The per-disulfuric acid releases hydrogen peroxide and hydrolyzes to sulfuric acid. Since only a low concentration of perdisulfuric acid is required, it is possible to electrolyze sulfuric acid just prior to reaction with barium carbonate. Thus, it is possible to simultaneously supply one of the reactants, sulfuric acid, and the strong oxidizing medium. Such a method completely avoids the handling of any oxidizing agent as a separate material and is easily controlled, merely by controlling the current passed through the sulfuric acid immediately prior to use.

It is known that solutions of sulfuric acid do not react efficiently with suspensions of barium carbonate, apparently because the forming barium sulfate more or less imperviously coats the unreacted carbonate. If the suspension contains a minor amount of an acid which forms a water soluble barium salt, the actual blanc fixe producing reaction occurs between such a soluble salt and sulfuric acid, regenerating the acid which will form additional soluble salt. It is readily apparent, since the acid is continuously regenerated, that very minor amounts of the soluble barium salt forming acid will suffice. It should also be apparent that relatively large amounts of acid could be used without deleterious effect. The amount of soluble barium salt forming acid employed is preferably sufficient, in relationship to its activity with barium, so that the rate at which a soluble barium salt is formed is at all times faster than the rate of addition of sulfuric acid. Any acid which forms a soluble barium salt may be employed, but hydrochloric acid is preferred. Other suitable acids include nitric, hydrobromic and acetic. Preferably, about 0.05 to 0.3 mole of acid are employed per mole of barium carbonate.

There is no criticality in the concentration or the amount of sulfuric acid used. However, for economic reasons, it is preferred to use a slight excess over that required to react with all of the barium carbonate employed.

The following examples, which are in no way intended to be limiting, illustrate in detail various embodiments of the present invention.

EXAMPLE 1

Barium carbonate was produced from a fresh, colorless to very pale yellow, barium sulfide solution by precipitation with flue gas containing less than one percent oxygen. The resultant barium carbonate was analyzed by standard chemical methods and found to contain:

| | Percent |
|---|---|
| Acid insoluble (barium sulfate)—calc. as S | 0.02 |
| Sulfur oxidizable by iodine at room temperature | 0.08 |
| Total gravimetric sulfur | 0.10 |

Two hundred grams of this barium carbonate were suspended in 1400 milliliters of water; fifty milliliters of saturated bromine water was added, and the suspension was heated to 70° C. Twenty ml. of 37 percent hydrochloric acid was added. Sulfuric acid, in the form of a 20 percent solution, was added over a period of twenty minutes until a test with a barium chloride solution showed a slight excess of sulfate ions. (Approximately one gram mole of $H_2SO_4$ was added.) The resultant thick suspension was stirred for about twenty minutes and then filtered and washed on a Buchner funnel with deionized water until the washings were neutral and chloride free. The blanc fixe so produced had a particle size, as determined by a standard dye adsorption test, of 0.35 micron and contained less than one part per million of reducible sulfur.

EXAMPLE 2

Example 1 was repeated, except that the bromine water was omitted. Reducible sulfur in the resultant product was too high to measure.

EXAMPLE 3

Example 1 was repeated using varying quantities of six percent hydrogen peroxide instead of bromine water. The following results were obtained:

| Ml. of 6% hydrogen peroxide: | Reducible sulfur |
|---|---|
| 5 | Above 10 p.p.m. |
| 10 | 2 p.p.m. |
| 20 | 2 p.p.m. |
| 50 | 1 p.p.m. |
| 100 | Less than 1 p.p.m. |

Except in the case of the five milliliter addition, the suspension when tested with starch iodide paper showed the presence of an active oxidizing agent throughout the reaction and stirring period. In all runs, except those employing five and ten ml. of the peroxide solution, the vapors above the reaction mixture also gave a positive test for active oxidants, suggesting the release of chlorine.

EXAMPLE 4

Example 2 was repeated, except that chlorine was bubbled through the mixture throughout the experiment. A very large excess of chlorine was used. The resultant blanc fixe contained over 10 p.p.m. of reducible sulfur.

EXAMPLE 5

Example 4 was repeated except that five milliliters of bromine water were added to the barium carbonate suspension and the rate at which chlorine was bubbled through the mixture was reduced to that just necessary to give a strong positive test for an active oxidant in the aqueous reaction medium. The blanc fixe obtained contained less than one part per million of reducible sulfur.

EXAMPLE 6

Two hundred grams of the barium carbonate of Example 1 were suspended in 1400 milliliters of water. This suspension was placed in a reaction vessel equipped with carbon electrodes, placed about two cm. apart, having about one square decimeter surface area each. Twenty milliliters of 37% hydrochloric acid were added. Current was then passed between the electrodes until an oxidizing condition could be detected in the liquid phase and continued as approximately one gram mole of sulfuric acid in the form of a 20% solution, was added over a period of about forty minutes. It was not possible to maintain a strong oxidizing condition at all times. The maximum current which would pass at twelve volts DC was only about five amperes. The resultant thick suspension was filtered and washed on a Buchner funnel with deionized water until the washings were neutral and chloride free. The resultant blanc fixe contained about three p.p.m. of reducible sulfur.

EXAMPLE 7

A 40% sulfuric acid solution, containing a trace of hydrochloric acid (about 0.5%), was electrolyzed at 25 amperes current between platinum electrodes having about 5 sq. cm. surface area each and spaced at a distance of about 0.5 cm. An EMF of eight volts was required. Titration of the iodine released from a potassium iodide solution by a known quantity of the resultant product indicated this acid was 0.04 normal in oxidizing material. Barium sulfate was made with this acid in the manner of Example 1, but without the addition of bromine water. The resultant product contained about three p.p.m. reducible sulfur.

The method of this example, whereby the oxidant is supplied simultaneously with the sulfuric acid, would not provide an oxidizing environment during the first part of the reaction. As the following example shows, if oxidizing conditions are maintained throughout the reaction period, the amount of reducible sulfur in the product is decreased even more.

EXAMPLE 8

A barium carbonate-HCl suspension was prepared, as in Example 1, but absent the bromine water. Bromine water was added dropwise to the suspension until starch iodide paper showed a faint trace of oxidizing compound. This required the addition of about five milliliters of bromine water. Sulfuric acid, electrolyzed as described in Example 7, was added to the suspension. The suspension gave a positive test for the presence of an oxidizing agent throughout the reaction and vapor above the suspension gave a faint but continuous test for an oxidizing agent. The barium sulfate thus prepared recovered in the manner described in Example 1, contained one p.p.m. reducible sulfur.

EXAMPLE 9

Example 7 was repeated except, using a barium carbonate suspension in which approximately one half of the suspending water was mother liquor filtrate obtained from Example 7. The filtrate contained sufficient excess oxidizing agent to oxidize the sulfur compounds released by the initial acid addition. The initial hydrochloric acid addition was reduced by the amount of hydrochloric acid present in the recycled mother liquor. The suspension gave a positive test for oxidizing agent throughout the reaction. The barium sulfate thus prepared, recovered in the manner described in Example 1, contained less than 1 p.p.m. reducible sulfur.

EXAMPLE 10

Sulfuric acid was prepared by direct electrolysis, as described in Example 7, except that electrolysis was continued until the acid was 0.2 normal in oxidizing compound. This acid was used in the preparation of blanc fixe in the manner prescribed in Example 8. In various runs the blanc fixe prepared tested between 0.4 and 1 part per million of reducible sulfur.

In all of the above examples, the particle size ranged from about 0.29 to about 0.35 micron, as determined by dye adsorption methods. This range is suitable for coating photographic paper. In any event, methods of controlling particle-size of blanc fixe are known in the art and the process of the present invention could be controlled to yield a wide range of particle sizes.

A test of the mother liquor from one of the above samples indicated that it contained almost all of the iron and alumina present in the reactants. A test of the blanc fixe produced, with acid ferro-ferricyanide reagent, showed the presence of only very minor amounts of iron-containing particles.

By measuring the voltage developed at a platinum electrode in comparison with a reference electrode (such as a calomel electrode, a plain silver billet electrode, or the like) in the reaction vessel, the oxidation-reduction state of the barium carbonate slurry can be continuously recorded or used as a control signal to control the oxidation potential of the reaction medium. In this manner, a product of uniform quality, free from either unoxidized sulfur compounds or undesirably large excesses of oxidizing agents can be obtained.

While what are considered to be preferred specific embodiments of the present invention have been described, it will be understood that various modifications and variations of the present invention, within the scope of the invention as defined by the appended claims, will become readily apparent to those skilled in the art.

What is claimed is:
1. A process for preparing blanc fixe which comprises:
 (A) reacting in a hot aqueous medium having an oxidation potential capable of oxidizing bromide to bromine, at a temperature of 70° C. in a five percent hydrochloric acid solution and containing a minor amount of an acid which is capable of reacting with barium carbonate to form a soluble barium salt,
  (1) barium carbonate containing sulfur impurities oxidizable by iodine at room temperature and no more than 0.03% by weight oxidizable sulfur impurities which are not oxidizable by iodine at room temperature, with
  (2) sulfuric acid, and
 (B) recovering the blanc fixe thus formed.
2. The process of claim 1 in which the oxidation potential of said aqueous medium is obtained by means of direct electrolysis of said medium.
3. The process of claim 1 in which the oxidation potential of said aqueous medium is obtained by the addition of a chemical oxidizing agent.
4. The process of claim 3 in which said chemical oxidizing agents are selected from the group consisting of peroxides, peroxy acids, salts of peroxy acids, hypochlorites, hypobromites, bromine, and chlorine.
5. The process of claim 3 n which said aqueous medium contains initially sufficient oxidizing agent to oxidize all the reducing sulfur initially in solution, and in which additional oxidizing agent is added to said aqueous medium during the course of the reaction.
6. The process of claim 5 wherein said additional oxidizing agent is per-disulfuric acid, said per-disulfuric acid being added to said aqueous medium in admixture with sulfuric acid, said per-disulfuric acid having been produced in situ in said sulfuric acid immediately prior to addition to said aqueous medium.
7. The process of claim 5 wherein the oxidizing agent initially present in said aqueous medium is introduced by adding a portion of the mother liquor from a preceding batch to said aqueous medium.
8. The process of claim 1 in which a substantial oxidation potential is maintained in said aqueous medium throughout the reaction period.
9. The process of claim 1 in which said acid which forms a soluble barium salt is hydrochloric acid.
10. The process of claim 1 in which said sulfuric acid is employed in an amount in excess of that required to react with all of the barium carbonate present.
11. A process for preparing blanc fixe which comprises:
 (A) electrolyzing a sulfuric acid solution until it contains a sufficient amount of per-disulfuric acid so that the resultant admixture will have an oxidation potential capable of oxidizing bromide to bromine, at a temperature of 70° C. in a five percent hydrochloric acid solution,
 (B) adding the per-disulfuric acid containing sulfuric acid solution thus formed, along with a minor amount of an acid which is capable of reacting with barium carbonate to form a soluble barium salt, to a hot barium carbonate suspension, which barium carbonate contains sulfur impurities oxidizable by iodine at room temperature and no more than 0.03% by weight oxidizable sulfur impurities which are not oxidizable by iodine at room temperature, and
 (C) recovering the blanc fixe thus formed.
12. The process of claim 11 in which a sufficient amount of bromine is added to the barium carbonate suspension so that the suspension will give a positive test for the presence of an oxidizing agent, prior to the addition of said per-disulfuric acid containing sulfuric acid to said suspension.
13. The process of claim 11 in which said acid which forms a soluble barium salt is present in said sulfuric acid solution during electrolysis.
14. The process of claim 1 in which said hot aqueous medium contains about 0.05 to 0.3 mole of said acid capable of forming a soluble barium salt per mole of barium carbonate reacted.
15. The process for preparing blanc fixe which comprises:
 (A) adding $H_2SO_4$ to a hot aqueous medium having oxidation potential capable of oxidizing bromide to bromine, at a temperature of 70° C. in a five percent hydrochloric solution,

(1) said medium having suspended therein barium carbonate containing sulfur impurities oxidizable by iodine at room temperature and no more than 0.03% by weight oxidizable sulfur impurities which are not oxidizable by iodine at room temperature, and
(2) a minor amount of an acid which reacts with barium carbonate to form a soluble barium salt, said acid being present in an amount sufficient so that the rate at which a soluble barium salt is formed is faster than the rate of addition of said sulfuric acid,
(B) recovering the blanc fixe thus formed.

References Cited

UNITED STATES PATENTS

| | | | |
|---|---|---|---|
| 1,981,094 | 11/1934 | D'Adrian | 23—122 |
| 2,522,971 | 9/1950 | Stinson | 23—122 |
| 2,637,700 | 5/1953 | Herbert | 23—66X |
| 3,421,843 | 1/1969 | Conaway et al. | 23—66 |

OTHER REFERENCES

Mahan, University Chemistry, p. 527 (Addison-Wesky, 1965).

OSCAR R. VERTIZ, Primary Examiner

C. B. RODMAN, Assistant Examiner

U.S. Cl. X.R.

23—66; 204—82, 104